S. ROSATO.
BEEHIVE.
APPLICATION FILED SEPT. 20, 1913.
1,135,623.
Patented Apr. 13, 1915.
4 SHEETS—SHEET 1.
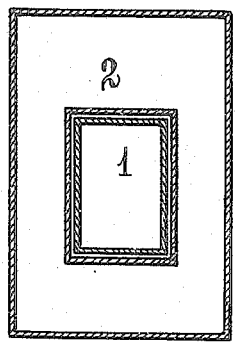
Fig. 1.
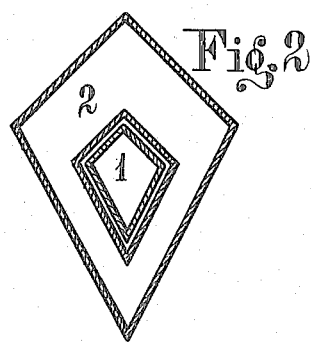
Fig. 2.
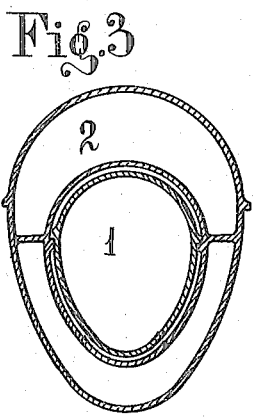
Fig. 3.
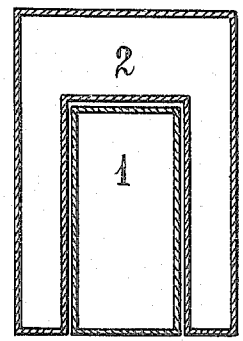
Fig. 4.
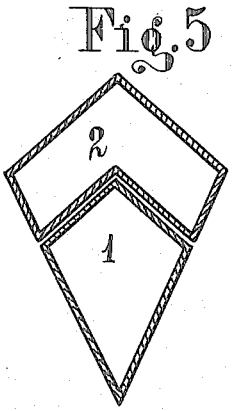
Fig. 5.
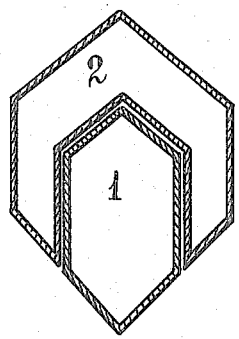
Fig. 6.
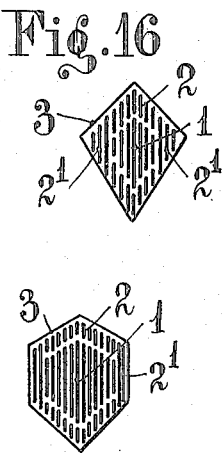
Fig. 16.
Fig. 17.
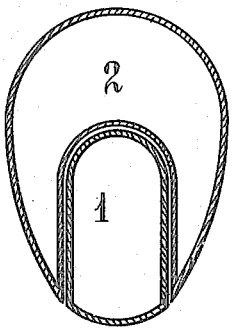
Fig. 7.
WITNESSES
Alfred R. Anderson
F. H. Logan
INVENTOR
SECONDO ROSATO
By H. Van Olderman
ATTORNEY S. ROSATO.
BEEHIVE.
APPLICATION FILED SEPT. 20, 1913.
1,135,623.
Patented Apr. 13, 1915.
4 SHEETS—SHEET 2.
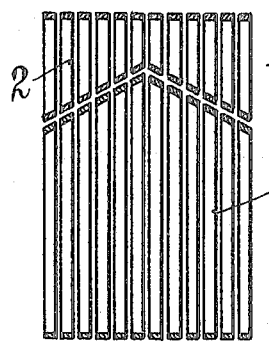
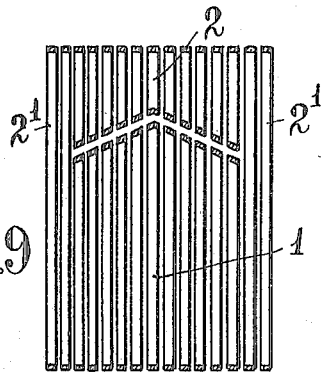
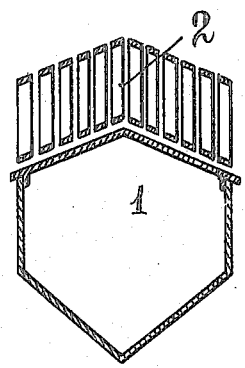
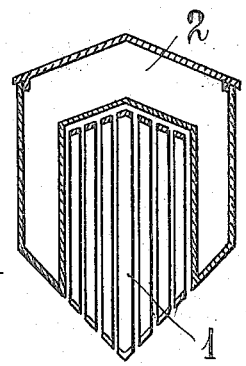
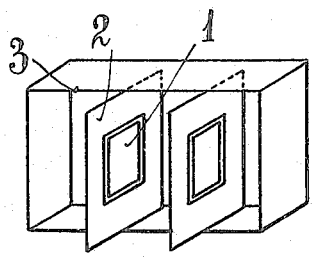
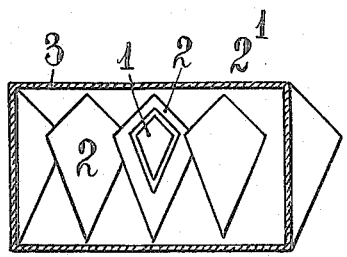
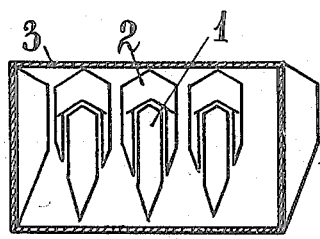
WITNESSES
Alfred R. Anderson
F. H. Logan
INVENTOR
SECONDO ROSATO
By Ivan Oldenmul
ATTORNEY S. ROSATO.
BEEHIVE.
APPLICATION FILED SEPT. 20, 1913.
1,135,623.
Patented Apr. 13, 1915.
4 SHEETS—SHEET 3.
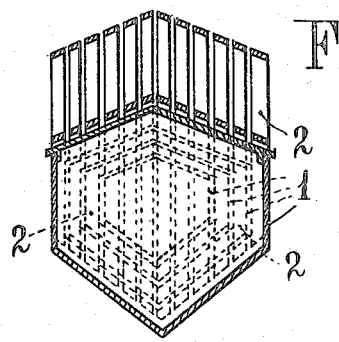
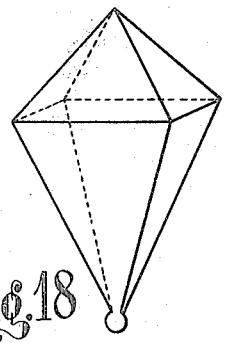
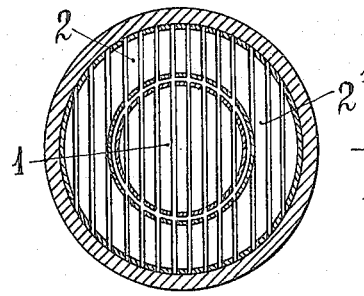
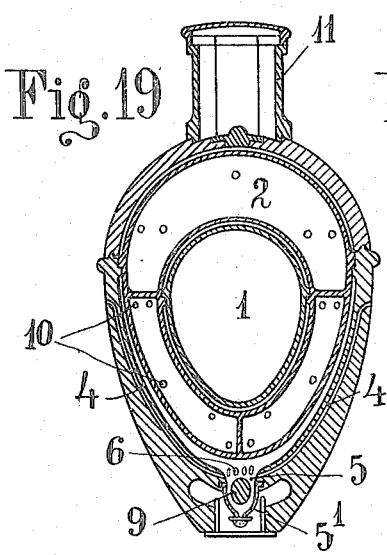
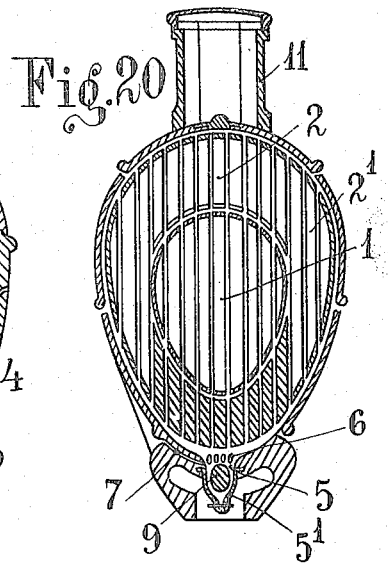
WITNESSES
Alfred R. Anderson
F. H. Logan
INVENTOR
SECONDO ROSATO
BY J. Van Idemmel
ATTORNEY

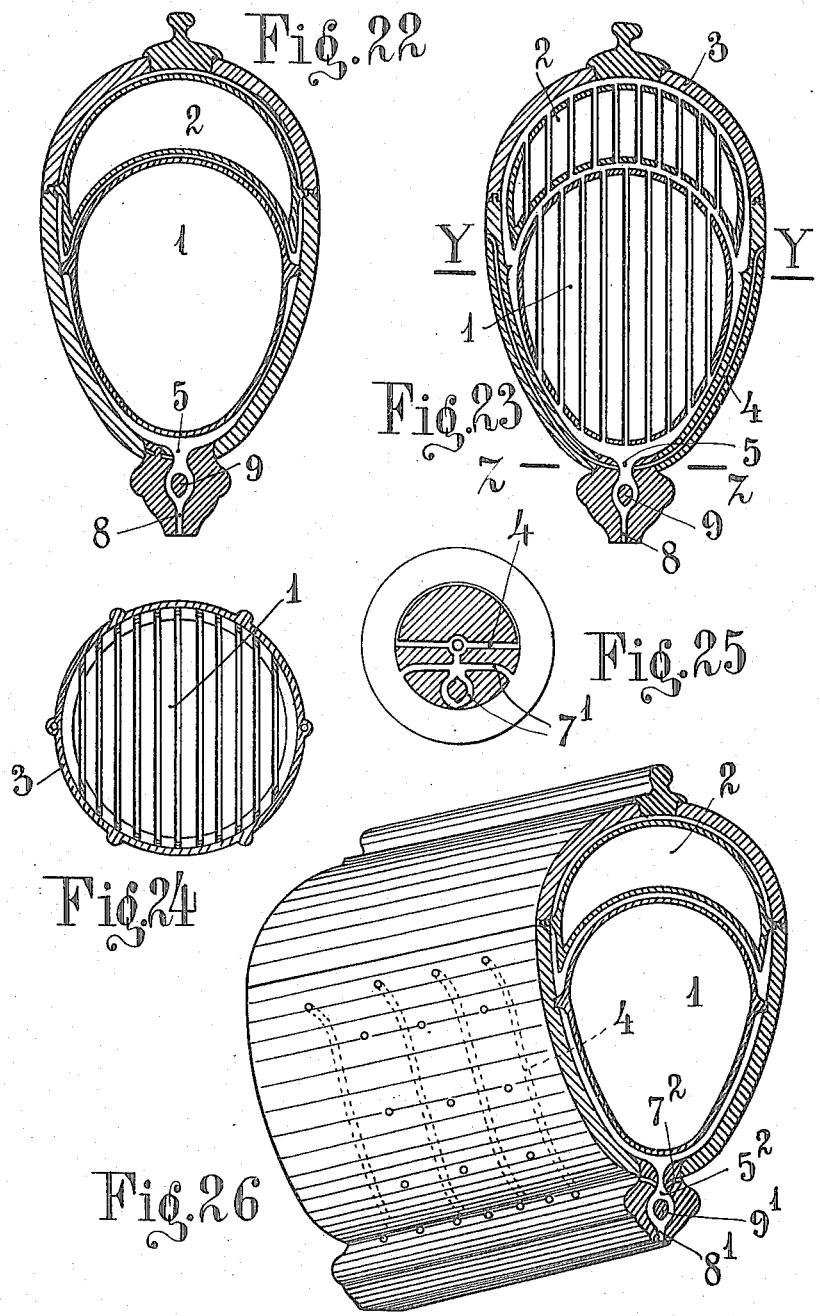

UNITED STATES PATENT OFFICE.

SECONDO ROSATO, OF SANT' AGOSTINO DI CAVOUR, ITALY.

BEEHIVE.

1,135,623.　　　　　　　Specification of Letters Patent.　　　Patented Apr. 13, 1915.

Application filed September 20, 1913.　Serial No. 790,859.

*To all whom it may concern:*

Be it known that I, SECONDO ROSATO, a subject of the King of Italy, residing at Sant' Agostino di Cavour, Italy, have invented certain new and useful Improvements in Beehives, of which the following is a specification.

This invention relates to bee hives and has for its object to provide a construction of hive in which with the object of assisting the work of the bees the frames are so arranged or disposed that the brood chamber may be completely or partially inclosed by the honey frames or supers.

Various embodiments of the invention are illustrated in the accompanying drawings, in which—

Figures 1 to 3 show diagrammatically three types of frames in which the element corresponding to the brood chamber is completely inclosed by the element forming the supers. Figs. 4 to 7 show other types of frames in which the brood chamber element is partially inclosed by that forming the supers. Figs. 8 and 9 show diagrammatically an arrangement of the frames in the casing by the aid of which the brood chamber is more or less completely surrounded by the supers in the direction at right angles to the plane of the frames. Figs. 10 and 11 illustrate a modification in the arrangement of the frames. Figs. 12 to 14 are diagrammatic views of the interior of the casing showing the arrangement of the frames. Figs. 15, 16 and 17 show other types. Fig. 18 shows one of the forms in which the casing may assume. Figs. 19 to 21 show in two vertical sections and in transverse section a bee hive formed in accordance with the invention. Figs. 22 and 23 are sections similar to those in Figs. 19 and 20 of another form. Fig. 24 is a transverse section on the line Y—Y of Fig. 23. Fig. 25 is a plan on the line Z—Z of Fig. 23. Fig. 26 shows in perspective another form of bee hive constructed in accordance with the invention.

As shown in Figs. 1 to 3, the members 1 which form the breeding cells may have any polygonal or rounded form and are inclosed by other frames 2 intended to form the supers. As the bees carry the greater portion of the honey to the upper part of the hive, it is advantageous to make the upper zone of all the frames 2 larger, and if desired, the frames of the brood chamber need not be inclosed at their lower side; in this case the frames 2 of the super may be of suitable form such as those shown in Figs. 4 to 7.

No matter what the form of the frames, they may be so arranged in the casing that the brood chamber is inclosed by the supers; thus in the case shown in Fig. 8 the members 1 of the brood chambers decrease in height from the middle toward the front ends of the hive, so that the frames 2, which may be of the same height or of correspondingly different heights, have their lower edges on a curved surface embracing the upper edges of the members 1.

In the construction shown in Fig. 9 the casing comprises, to correspond with the front ends of the hive, one or more frames 2' extending throughout the height of the casing in such manner that the brood chamber is closed at both ends by the supers.

The frames corresponding to the brood chamber and to the supers in place of being arranged in the same plane may be arranged at right angles to one another as shown in Figs. 10, 11 or 15. In this case, the frames 2 may have any suitable form or any of those shown in Figs. 4 to 7, and also of decreasing sections toward the front ends as shown in Fig. 15, so that the brood chamber is more or less inclosed by the supers in all directions. On the other hand it is clear that if in the constructions shown in Figs. 8 and 9 the frames shown in Figs. 1 to 3 or 4 to 7 are used, the brood chamber is also more or less inclosed in the transverse direction of the hive, that is to say, in the plane of the frames. Similarly by arranging in a casing 3 of suitable form, several frames all of the same form and dimensions, the brood chamber will be surrounded more or less completely in the transverse direction and will remain open on the front as shown in Figs. 12 and 14, while by adopting the frames shown in Figs. 1 to 3, and arranging that both ends of the frames 2' are completely reserved for honey, the brood chamber may be surrounded on all sides by the supers (Fig. 13). These forms may be used with cases of polyhedral form (Fig. 18), in which case the arrangement diagrammatically shown in Figs. 16 and 17 or the ovoid form (Figs. 19 to 21, and 22 to 24) is obtained.

The hive constructed in accordance with

Figs. 19 to 21 illustrates the principle of the invention in its best theoretical conditions.

Each member 1 of the brood chamber is completely inclosed by the corresponding frame of the super and the section of these frames diminishes gradually in proportion to the distance from the middle frame, while at both ends are arranged the frames 2' exclusively reserved for honey.

The type shown in Figs. 22 to 24 differs mainly in the form of the frames 2, which are limited to inclose the upper part of the nest. In these figures are also represented several accessory arrangements adapted for application of all the other types, namely the passages 4 formed in the walls of the member 3 and intended for ventilation of the interior of the hive, as also the lower chamber 5 provided with orifices 6 against which abut tortuous passages 7 for admitting the bees.

In the construction shown in Figs. 19 and 20, the chamber 5 is formed by a section 5' open if desired at the lower end, which may be screwed to the floor-board of the hive and may be easily removed for the cleaning of the interior.

In the construction shown in Figs. 22 to 24, the chamber 5 communicates also at its lower end with the exterior by means of a passage 8 and tortuous passages 7' are arranged as shown in Fig. 25 and permitting as in the preceding case the entrance of the bees to the hive, while preventing them from passing out, and also preventing the entrance of other bees.

In the chamber 5 may also be arranged a member 9 preventing air and light from passing directly to the interior.

Passages 10 may be provided in the casing shown in Fig. 19.

If the casing has an elongated form such as in Fig. 26, the chamber 5 may be replaced by any suitable number of similar chambers arranged on the lower side of the casing or by a longitudinal space 5'' communicating at the lower end with the exterior or through an opening 8' and inclosing a rod 9'. The tortuous passages 7'' are provided with the object referred to.

It may also be advantageous to provide the casing as shown in Figs. 19 and 20 with a chamber 11 at its upper end and within which chamber may be arranged a receptacle containing water or food for the bees.

By the arrangements described, a hive is produced which will adapt itself to the habits of the bees, assist them in their work and permit of an increase in the production of honey.

Having described my invention I declare that what I claim and desire to secure by Letters Patent of the United States is:—

1. A hive comprising a casing; a plurality of frames forming a brood chamber; and a plurality of frames forming a honey chamber surrounding the brood chamber on all sides and disposed within the casing.

2. A hive comprising a plurality of frames forming the brood chamber; a plurality of frames forming the honey chamber, certain of the honey chamber frames surrounding the frames of the brood chamber, and certain of the honey chamber frames being centrally continuous and forming the front of the brood chamber; and a casing inclosing the frames.

3. A hive comprising a casing; a plurality of frames forming a brood chamber decreasing in cross-section away from the central section; and a plurality of frames within the casing, and forming the honey chamber, some of the frames surrounding the respective frames of the brood chamber and others forming the fronts thereof.

4. A hive comprising a casing of oval section; a plurality of oval frames forming a brood chamber; and a plurality of oval frames in the casing and forming the honey chamber and each having toward their center an oval opening in which is received a frame of the brood chamber.

5. A hive comprising an ovoidal casing; a plurality of oval frames forming the brood chamber, the frames presenting a section decreasing from the central section; and a plurality of oval frames within the casing and forming the honey chamber and decreasing in size from the central frame, the inner frames provided with an opening for the reception of the brood chamber, the outer frames of the brood chamber forming the fronts of the brood chamber.

6. In a hive the combination with a casing, said casing being provided with ventilation passages, a brood chamber within said casing, supers partly inclosing said brood chamber, and a frame located at each end of said casing, as and for the purpose set forth.

7. A hive comprising in combination with a casing said casing being provided with ventilation passages, a solid member within said casing, said solid member serving to prevent air and light from entering directly into the interior of said casing, a brood chamber also within said casing, supers partly inclosing said brood chamber, and a frame located at each end of said casing, as and for the purpose set forth.

In testimony whereof I affix my signature in presence of two witnesses.

SECONDO ROSATO.

Witnesses:
   CARLO TORTA ING,
   C. S. FEYLES.

Copies of this patent may be obtained for five cents each, by addressing the "Commissioner of Patents, Washington, D. C."